(12) United States Patent
Almeras et al.

(10) Patent No.: US 6,386,811 B2
(45) Date of Patent: May 14, 2002

(54) FIXING STAPLE FOR DELICATE MATERIAL

(75) Inventors: Roland Almeras; Patrick Herelier, both of Tournon (FR)

(73) Assignee: Societe de Prospection et D Inventions Techniques Spit, Bourg-les-Valence (FR)

( * ) Notice: Subject to any disclaimer, the term of this patent is extended or adjusted under 35 U.S.C. 154(b) by 0 days.

(21) Appl. No.: 09/730,889

(22) Filed: Dec. 7, 2000

(30) Foreign Application Priority Data

Dec. 17, 1999 (FR) .............................. 99 15964

(51) Int. Cl.[7] .......................... F16B 15/00; F16B 15/02
(52) U.S. Cl. ................... 411/471; 411/359; 411/473; 411/920
(58) Field of Search .............................. 411/358, 359, 411/471, 472, 920, 473

(56) References Cited

U.S. PATENT DOCUMENTS 2,034,080 A  3/1936  Bitzenburger

FOREIGN PATENT DOCUMENTS

| DE | 15 36 724 A | 3/1970 |
|---|---|---|
| FR | 2 206 808 A | 6/1974 |
| GB | 259924 | 9/1926 |
| GB | 2 238 591 A | 6/1991 |
| GB | 2257765 | 1/1993 |

*Primary Examiner*—Neill Wilson
(74) *Attorney, Agent, or Firm*—Lowe Hauptman Gilman & Berner, LLP

(57) ABSTRACT

A staple (4) for a delicate material (22) comprises two flexible legs (46, 47) between a head portion (56) connecting the legs and an introduction end portion (57). Between the head and end portions is located a discontinuity portion (58) so that when the staple is pushed into the material (22), at least one of the legs (46, 47) inclines with respect to the head portion (45) and thus ensures good resistance to extraction. The two legs (46, 47) are bent (76, 77) inwardly in the discontinuity portion (58) of the whole assembly to diverge from one another upon fixing the staple to the delicate material.

20 Claims, 2 Drawing Sheets

FIXING STAPLE FOR DELICATE MATERIAL

FIELD OF THE INVENTION

The present invention relates to staples intended to fix items to a delicate material of low density and low strength, such as a friable material of the type formed from a layer of plaster between two cardboard sheets.

The items to be fixed may include metal wires and elements made from synthetic material, such as electrician's channelling.

BACKGROUND OF THE INVENTION

Already known is a fixing staple for delicate material, formed from an assembly of two flexible legs extending between a head portion connecting the legs and an introduction end portion, the assembly providing, between the two portions, head and end, a discontinuity portion so that when it is pushed into the material, at least one of the legs inclines with respect to the head portion and thus ensures good resistance to extraction.

Such a staple is disclosed, among others, in GB 2238591 and DE 3623712.

With the staple of these references, the leg which can be inclined is longer than the other in order to converge more easily towards the other when being pushed in, the discontinuity portion of the assembly extending around the shorter leg.

Still, when the staple is pushed in, even if the leg which can be inclined is the only one to really become inclined and if the shorter leg only inclines slightly with respect to the head, the inclination of the large leg should suffice to hold the staple. By reason of the difference in length of the two legs of the staple, creating the discontinuity portion, it should be possible to avoid, during insertion, the legs remaining parallel to each other or their inclination with respect to the head portion remaining invariable when being pushed in in the direction of the force applied to the staple. Furthermore, when the shorter leg is pushed in it should increase the convergence of the two legs.

However, with such a type of staple, inclination of the legs is still not always perfect or efficient.

SUMMARY OF THE INVENTION

The instant invention aims to propose a staple which is better suited to soft and friable materials.

To this end, the invention relates to a fixing staple for soft material of the type herein above defined, characterized in that the two legs are bent inwards in the discontinuity portion of the assembly in order to diverge from one another when being pushed in.

Thanks to the bent portion of the legs of the staple, the length of the legs has been increased, and hence their flexibility, and therefore the assurance of their divergence has also been increased as well as of an outstanding resistance to extraction, without increasing the overall length of the staple.

In a preferred manner, the legs are chamfered from the inside to the outside as far as their introduction end.

It is also advantageous that the widths of the head portion and introduction end portion are substantially equal.

The staple can be formed from a strand which has a cross-section selected from a circle, rectangle and oval.

BRIEF DESCRIPTION OF THE DRAWINGS

The invention will be better understood with the aid of the following description of a preferred embodiment of the staple of the invention, with reference to the attached drawing, in which.

DETAILED DESCRIPTION OF THE INVENTION

Figure 1:
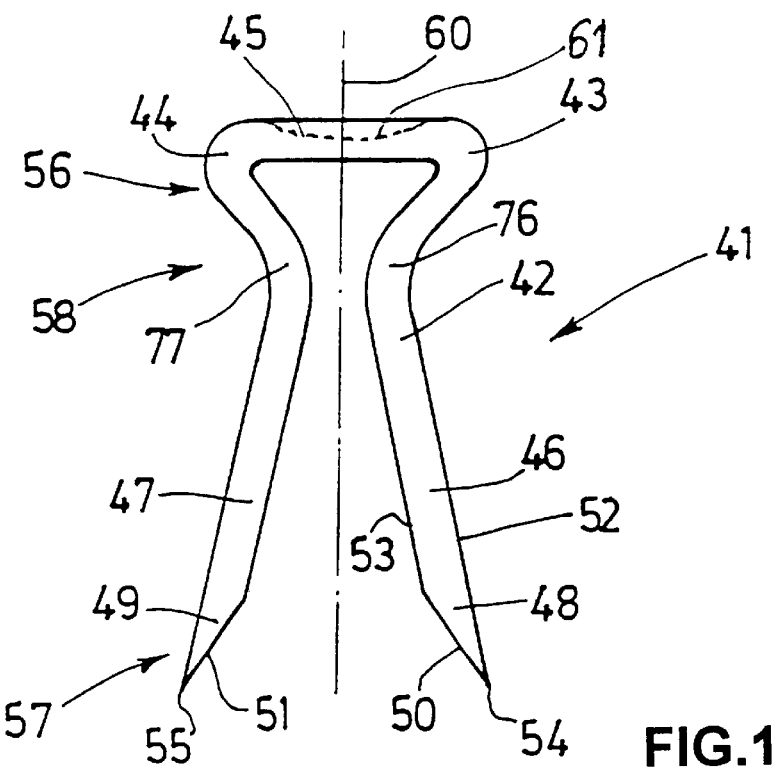
FIG. 1 is a profile view of the staple with bent legs, in accordance with the invention
Figure 2:
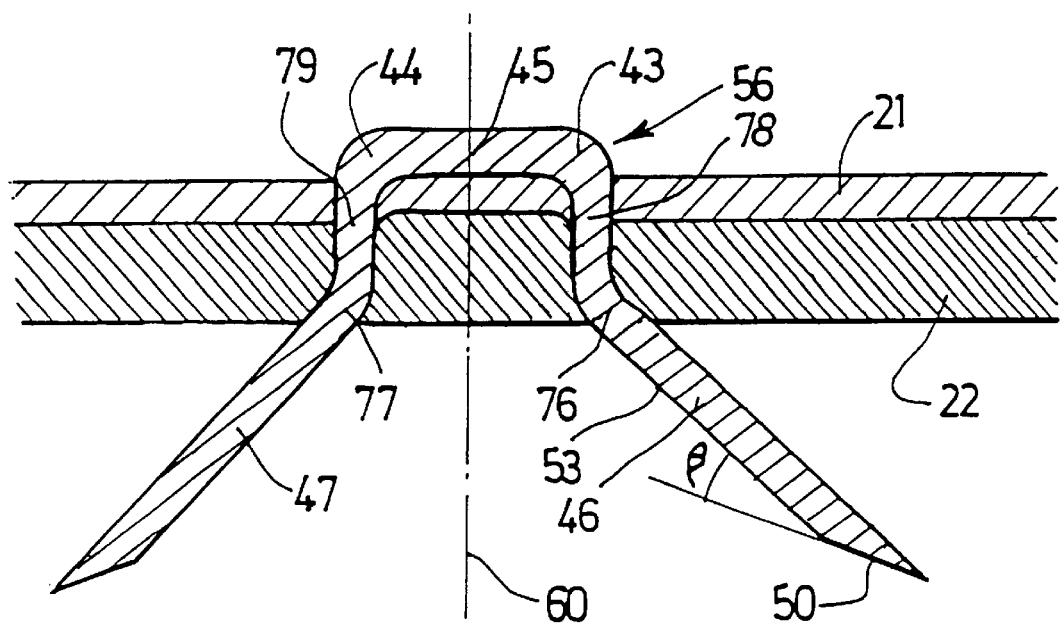
FIG. 2 is a cross-sectional view of the staple of FIG. 1, in a fixing state in a soft material.

The staple of FIGS. 1 and 2 is a symetrical staple 41 (with respect to plane 60) with diverging legs.

Figure 3:
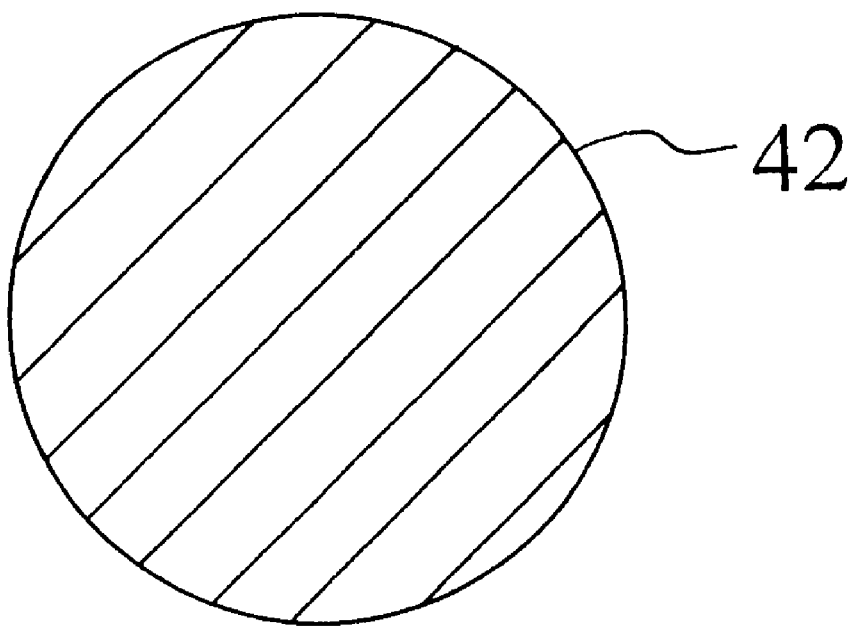
FIG. 3 is a cross-sectional viewing of a strand used in manufacturing of the staple in an embodiment of the present invention.

Being made of metal or a synthetic material, it is formed from a strand 42 of which the cross-section can be equally circular (FIG. 3), rectangular or oval.

The strand 42 of the staple assembly 41 has been bent in four places (not at a right angle) to provide, between two acute bends 43, 44 which open towards the inside, a connecting head 45 and, beyond them, two legs 46, 47 which in this case are substantially the same length, having, in a discontinuity portion 58 between the two portions, head 56 and end 57, two obtuse bends 76, 77 respectively protruding towards the inside of the staple and thus open to the outside. In other words, the two legs 46, 47 are bent 76, 77 inwardly in the discontinuity portion 58 of the whole assembly to diverge from one another upon pushing it.

The two legs 46, 47 are of substantially the same length. Their introduction ends 48, 49, in the end portion 57, are chamfered at 50, 51, from the inside 53 to the outside 52. The angle $\beta$ of the chamfer 50, 51 with respect to the inside 53 is advantageously between 10 and 30°.

It will be noted that it is of interest to adopt a width for the connecting head portion 45 substantially equal to the distance between the introduction points 54, 55 of the two legs 46, 47, i.e. the overall width of the end portion 57.

Referring to FIG. 2, the staple 41 is intended to fix an item 21 to a support material 22. When the staple is pushed in, the legs 46, 47 incline outwards with respect to the connecting head 45 in order to diverge one from the other and thus ensure good resistance to extraction.

It will be noted that it is advantageous for the angle of opening of the discontinuity bends 76, 77 to be between 135° and 160°, for the approximate length of the leg segments 78, 79, between the external bends 43, 44 and the internal bends 76, 77, to be at most equal to the sum of the thicknesses of the item 21 to be fixed and of the support material 22 and greater than half of this total thickness and for the length of the whole staple, from the head portion 56 to the introduction end portion 57, to be at least equal to twice this total thickness.

The connecting head portion could also possibly comprises a weakened zone, with a cross section reduced with respect to that of the rest of the strand of the staple, to facilitate its deformation upon fixing it and enhance a good opening or divergence of the legs. Any kinds of weakening are possible: reduction of cross-section uniform along the overall length of the head portion, reduction of cross-section limited to a zone, reduction of cross-section decreasing on both sides of a central plane, as shown in dot line 61 on FIG. 1, etc.

What is claimed is:

1. A fixing member, comprising two legs and a head portion connecting said legs;

each of said legs comprising first and second portions, said first portion being connected to said head portion via an acute bend portion and extending inwardly of said fixing member toward the other leg, and said second portion being connected to said first portion via an obtuse bend portion and extending outwardly of said fixing member away from the other leg;

wherein said second portion has a length at least twice as long as that of said first portion.

2. The fixing member of claim 1, wherein said second portion has a tapered distal end which is chamfered outwardly.

3. The fixing member of claim 2, wherein a length of said head portion is substantially equal to a distance between the tapered distal ends of said second portions.

4. The fixing member of claim 1, wherein said fixing member is formed from a strand having a substantially circular cross section.

5. The fixing member of claim 1, wherein said head portion comprises a weakened zone.

6. The fixing member of claim 5, wherein the weakened zone has a cross-sectional area increasing from a central region of said head portion toward said acute bend portions.

7. The fixing member of claim 5, wherein said fixing member has a substantially uniform width except for the weakened zone of said head portion and tapered distal ends of said second portions.

8. The fixing member of claim 4, wherein said head portion is substantially straight.

9. The fixing member of claim 1, wherein said first and second portions of each of said legs are straight, and describe an angle of from about 135° to about 160°.

10. A fixing member, comprising two legs and a head portion connecting said legs;

each of said legs comprising first and second portions, said first portion being connected to said head portion via an acute bend portion and extending inwardly of said fixing member toward the other leg, and said second portion being connected to said first portion via an obtuse bend portion and extending outwardly of said fixing member away from the other leg;

wherein said head portion comprises a weakened zone having a cross-sectional area increasing from a central region of said head portion toward said acute bend portions.

11. The fixing member of claim 10, wherein the cross-sectional area of the weakened zone gradually increases from the central region of said head portion toward said acute bend portions.

12. The fixing member of claim 10, wherein said head portion extends in a transverse direction of said fixing member and has an inner edge and an outer edge, and a width of said head portion between the inner and outer edges, as measured in a longitudinal direction of said fixing member which is substantially perpendicular to the transverse direction, increases from the central region of said head portion toward said acute bend portions.

13. The fixing member of claim 10, wherein the inner edge is substantially straight while the outer edge is concavely curved.

14. A connection, comprising an item to be fixed, a support material and a staple fastening said item to said support material;

said staple comprising two legs and a head portion connecting said legs, each of said legs comprising first and second portions, said first portion being connected to said head portion via a first bend portion, and said second portion being connected to said first portion via an obtuse bend portion and extending outwardly of said staple away from the other leg;

wherein, in a state prior to fastening said item to said support material, said first bend portion is an acute bend so that said first portion extends inwardly of said staple toward the other leg; and wherein a length of said first portion is not greater than a sum of thicknesses of said item and said support material, and is greater than half the sum.

15. The connection of claim 14, wherein a length of said second portion is at least twice the sum.

16. The connection of claim 15, wherein said first portion is substantially completely planted in said item and said support material when said item has been fastened to said support material.

17. The connection of claim 14, wherein said head portion has an inner straight edge abutting a flat upper surface of said item.

18. The connection of claim 17, wherein said first portion extends substantially perpendicularly to the upper surface of said item.

19. The connection of claim 14, wherein said second portion has a tapered distal end pointing outwardly of said staple and away from said item.

20. The connection of claim 14, wherein said head portion comprises a weakened zone of a cross-sectional area increasing from a central region of said head portion toward said first bend portions.

* * * * *